(12) United States Patent
Delaporte

(10) Patent No.: US 6,622,552 B1
(45) Date of Patent: Sep. 23, 2003

(54) SYSTEM FOR CHECKING THE PRESSURE OF THE TIRES OF A VEHICLE

(75) Inventor: Francis Delaporte, Osny (FR)

(73) Assignee: Johnson Controls Automotive Electronics, Osny (FR)

(*) Notice: Subject to any disclaimer, the term of this patent is extended or adjusted under 35 U.S.C. 154(b) by 0 days.

(21) Appl. No.: 10/069,828
(22) PCT Filed: Aug. 29, 2000
(86) PCT No.: PCT/FR00/02397
§ 371 (c)(1), (2), (4) Date: May 14, 2002
(87) PCT Pub. No.: WO01/17805
PCT Pub. Date: Mar. 15, 2001

(30) Foreign Application Priority Data

Sep. 3, 1999 (FR) .............................................. 99 11074

(51) Int. Cl.$^7$ ............................................. G01M 17/02
(52) U.S. Cl. .......................... 73/146; 73/146.3; 340/442; 340/447
(58) Field of Search ................................ 73/146–146.8; 340/442–447

(56) References Cited

U.S. PATENT DOCUMENTS

| | | | | |
|---|---|---|---|---|
| 5,289,160 A | * | 2/1994 | Fiorletta | 340/447 |
| 5,924,055 A | * | 7/1999 | Hattori | 702/138 |
| 6,463,799 B1 | * | 10/2002 | Oldenettel et al. | 73/146.5 |
| 6,489,888 B1 | * | 12/2002 | Honeck et al. | 340/442 |
| 6,529,807 B2 | * | 3/2003 | Sugisawa | 701/29 |

* cited by examiner

Primary Examiner—Edward Lefkowitz
Assistant Examiner—Jermaine Jenkins
(74) Attorney, Agent, or Firm—Foley & Lardner

(57) ABSTRACT

The system for checking the pressure of the tires of the wheels (2–5) of a vehicle includes individual wheel-checking devices, each with a pressure sensor and a transmitter (20, 30, 40, 50), a central unit (1) with a common receiver (12) and antenna means (21–25), comprising individual receiving antennae (22–25) associated respectively with the wheel locations (2–5), working with the transmitters (20, 30, 40, 50), and the antenna circuits of the central unit (1) additionally comprise a main antenna (21) for monitoring all the pressure-checking devices (20, 30, 40, 50) and circuits (13) for switching over the common receiver (12) from the main monitoring antenna (21) onto each of the individual acquisition antennae (22–25).

4 Claims, 1 Drawing Sheet

SYSTEM FOR CHECKING THE PRESSURE OF THE TIRES OF A VEHICLE

Figure 1:
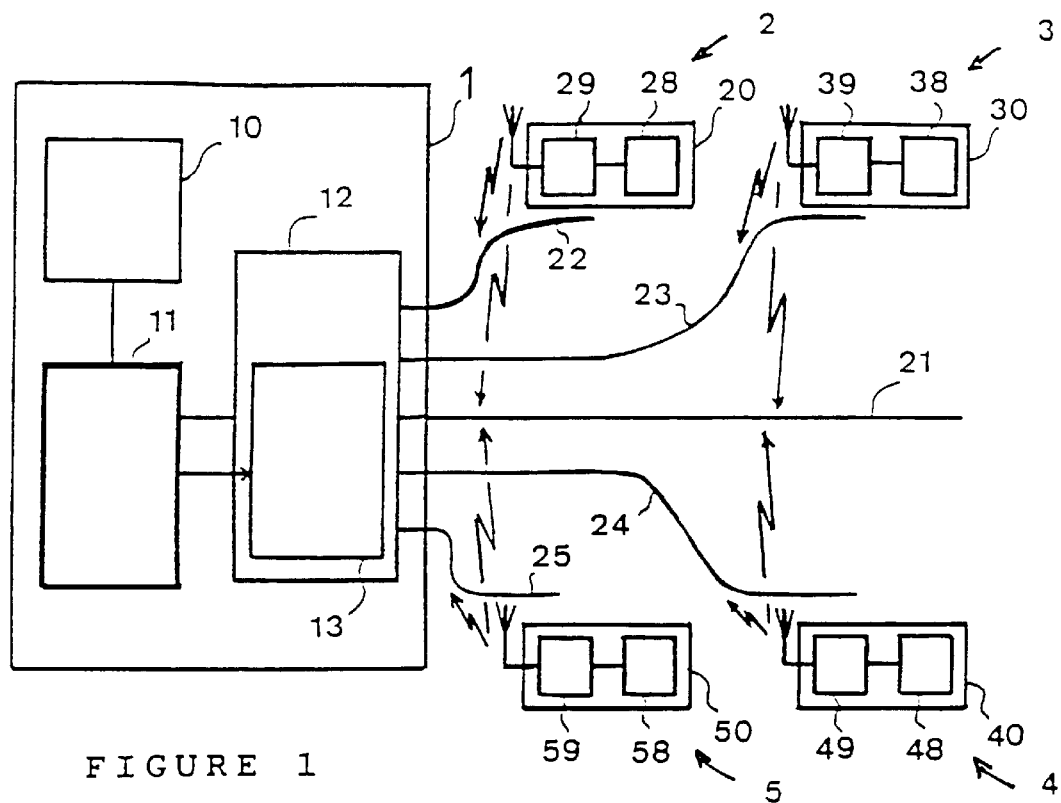

A system for checking the pressure of the tires of a motor vehicle includes, around a central computer equipped with a receiver, with its receiving antenna, individual checking devices, one per wheel, each comprising, inserted into the rim, a pressure sensor and a transmitter, with its transmitting antenna. Each device has to transmit regularly, to the central computer, bursts of information bits relating to the pressure of the associated tire, and it has to transmit a defined number of them, generally five, all identical, so that another defined number, generally two, of these bursts should be received and so that it can therefore be considered that the information at that instant has actually been transmitted and received. The transmission of the bursts can take place, to give an idea, every hour, if the vehicle is at rest, every six minutes, if the vehicle is running.

The system developed above exhibits the drawback that, after having changed the wheels, the system may detect a lack of pressure at one wheel which is not actually a faulty wheel. With the bursts of information bits being in effect "signed" by their respective wheels, if, for example, the two front wheels are changed over and then the pressure of the left wheel falls, the system will indicate that it is the original right wheel, which has become the left wheel, which is faulty.

DE 195 18 806 teaches a radio system for checking the pressure of the tires, with antennae associated electromagnetically with the locations of the respective wheels, in order to identify them.

However, as the transmitter devices of the wheels are mutually independent, their transmissions are asynchronous and the central receiver has to be able to detect every start-of-transmission so as to synchronize itself and to receive the information transmitted.

The present application claims to have a solution to this problem.

The invention thus relates to a system for checking the pressure of the tires of the wheels of a vehicle including individual wheel-checking devices, each with a pressure sensor and a transmitter, a central unit with a common receiver and antenna means, comprising individual receiving antennae associated respectively with the wheel locations, configured to work with the transmitters of the individual checking devices, the system being characterized in that the receiving-antenna means of the central unit additionally comprise a main antenna for monitoring all the pressure-checking devices and means for switching over the common receiver of the central unit from the main monitoring antenna onto each of the individual acquisition antennae.

Thus, with the main monitoring antenna having made it possible to detect the failure of a tire, as yet undefined, one of the individual antennae will make it possible to acquire the identification of the tire concerned. Any difficulty relating to the asynchronous transmission from the wheel devices is thus avoided.

Advantageously, with the wheel-checking devices being configured to periodically transmit bursts of information bits, the changeover-switching means are configured to switch over from the main receiving antenna onto an individual receiving antenna in the course of the same burst period.

If, after switching over, the common receiver receives the rest of the bursts, then it is the wheel tire associated with the individual antenna concerned which is actually the faulty tire. Otherwise, the following burst period will be awaited in order to switch over to another individual antenna and so on until the faulty wheel tire has been identified.

Very advantageously, the receiving antennae are radiating cables.

The invention will be better understood with the aid of the following description of a preferred embodiment of the tire-pressure checking system, by reference to the attached drawing, in which:

FIG. 1 is a functional block diagram of the pressure-checking device, and

FIG. 2, formed by FIGS. 2A, 2B, 2C, 2D, 2E and 2F, is a timing diagram illustrating the operation of it.

The tire-pressure checking device of FIG. 1 is mounted on a motor vehicle, of which only the four wheels 2, 3, 4 and 5 are represented diagrammatically. It includes a central unit 1 linked at its input by radio to the wheels 2 to 5.

The wheels 2 to 5 each include an individual wheel-pressure checking device, referenced 20, 30, 40 and 50 respectively, each including a radio transmitter, 29, 39, 49, 59 respectively, powered by battery, associated with a pressure sensor, 28, 38, 48, 58 respectively, in order to transmit pressure telemetry to the central unit 1. The latter, to that end, includes a plurality of receiving antennae, four individual antennae 22, 23, 24 and 25 to be precise, and a main monitoring antenna 21.

The central unit 1 includes a timebase 10 linked to a microprocessor 11 which is itself linked to the output of radio-receiver circuits 12 to which the antennae 21 to 25 are connected. The microprocessor 11 controls antenna-switching circuits 13 belonging to the radio circuits 12.

The radio-receiver circuits 12 form a common receiver for all the antennae 21 to 25, which work with the respective transmitters 29, 39, 49, 59 of the individual devices 20, 30, 40, 50 for checking the wheels 2 to 5 and the antennae 22 to 25 of the central unit 1 are individual receiving antennae associated respectively with the wheel locations of the vehicle. Each individual antenna 22 to 25 thus includes at least one segment, an end segment in the figure, situated in immediate proximity to the associated wheel 2 to 5 so as to form a one-to-one electromagnetic association between the transmitter of the wheel 2 to 5 in question and the segment of the associated antenna 22 to 25. In other words, the individual receiving antennae 22 to 25 are electromagnetically associated, in a one-to-one way, with the respective wheel locations 2 to 5 and thus each constitute an antenna for selective acquisition of the telemetry from the associated pressure-checking device 20, 30, 40, 50.

Apart from the receiving segment above, each individual antenna, such as 22, can be screened so that it remains insensitive to the radiation from the other three transmitters 39, 49, 59 of the wheels 3 to 5 which are not associated with the antenna 22.

In this example, the individual, short-range antennae 22 to 25 are radiating cables forming a proximity sensor.

Thus, each individual antenna 22 to 25 transmits, to the radio-receiver circuits 12, only the transmissions from the checking device 20, 30, 40, 50 of the associated wheel 2 to 5. The central unit 1 identifies the individual antenna 22 to 25 then switched in, or polled, at the input to the radio circuits 12 by the circuits 13 according to the routing or selection addresses or orders which have been transmitted to the latter by the microprocessor 11, a correspondence table in memory indicating the individual antenna 22 to 25 concerned on the basis of the routing address. The central unit 1 can thus associate with the radio data received by the circuits 12 a defined wheel location 2 to 5 and thus, in the event of a lack of pressure, signal the position, or the location, of the wheel 2 to 5 in question.

The main monitoring antenna 21 serves to synchronize the sequencing of the operation of the central unit 1 for the acquisition of the pressure telemetry. This is because the radio circuits 13 here include only a single radio-telemetry acquisition system, common to the four individual acquisition antennae 22 to 25, such that the microprocessor 11 has to cause a listening scan of the four transmitters from the wheels 2 to 5 in order to acquire their transmissions.

These transmissions of trains of bursts occur with a burst period T of 1 hour when the wheels 2 to 5 are stopped, or at least are turning only at a speed less than a lower threshold and, otherwise, every six minutes when the threshold is exceeded. Each transmission period includes five identical bursts of information bits with an elementary period of 20 milliseconds, each lasting 8 milliseconds and spaced by 12 milliseconds.

The polling by the microprocessor 11 is synchronized to the transmissions from the wheels 2 to 5. To do that, the main antenna 21 is designed to detect the transmissions from all the wheels 2 to 5 and the microprocessor 11 drives the changeover-switching circuits 13 so that, with the checking device in the rest state, it is the main monitoring antenna 21 which is linked to the common radio-reception system.

Thus, when the radio circuits 12 receive a first burst, the microprocessor 11 is informed thereof and this reception causes a polling scan of the individual acquisition antennae 22 to 25, one of which has also received the burst and will therefore receive the following ones.

Having regard to the fact that there are five associated bursts on each occasion during one overall period of bursts, with known periodicity equal to 20 ms, it would have been possible to make provision to detect the first burst then immediately to order successive polls of the four antennae 22 to 25 for a period of 20 ms on each occasion, so as to receive one of the next four bursts of the train and thus identify the individual antenna 22 to 25 which is receiving the train of bursts.

Figure 2A:
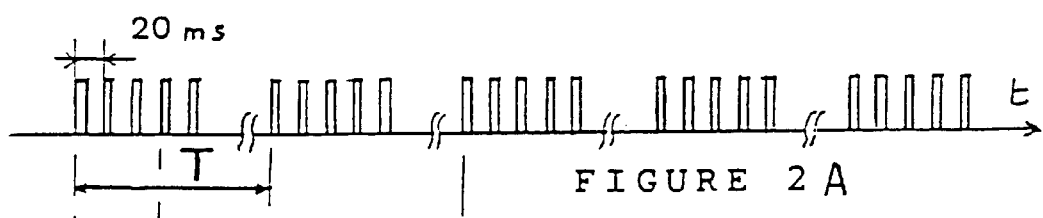
Figure 2B:
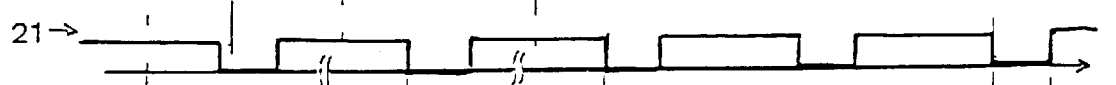
Figure 2C:
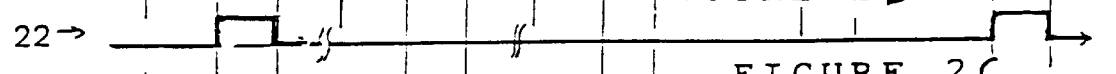
Figure 2D:
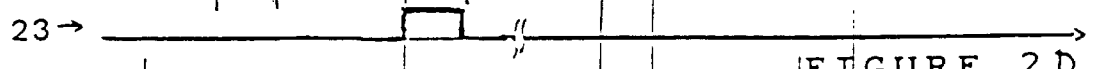
Figure 2E:
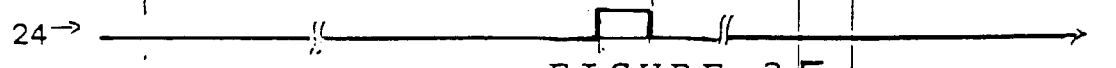
Figure 2F:
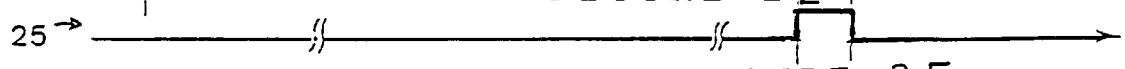

Here, however, in order better to tolerate the faults in radio transmission which are liable to make the received bursts unusable, the microprocessor 11 waits until it has received three bursts of the train five bursts (FIG. 2B) before ordering the switching-over of the receiving system from the main monitoring antenna 21 onto one of the individual acquisition antennae 22 to 25, for example the antenna 22. Thus the microprocessor 11 drives the changeover-switching circuits 13 so as to switch over from the main receiving antenna 21 onto one of the individual receiving antennae 22 to 25 in the course of the same period of bursts, over a little under one hundred milliseconds or so. FIG. 2A represents five trains of five bursts, as a function of time t. FIGS. 2B, 2C, 2C, 2E and 2F represent polling windows for the respective antennae 21, 22, 23, 24, 25, that is to say the selection status of one of the antennae as regards the radio-reception system controlled by the changeover-switching circuits 13.

The switched-over state corresponding to the individual antenna 22 (FIG. 2C) is maintained for at least two individual periods (40 ms) so as to detect the last two bursts of the train. If at least one of these last two bursts represents a bit pattern, possibly after correction by a self-corrector code, similar to the bit pattern of at least one of the first three bursts received by the monitoring antenna 21, the wheel in question, 22, is identified as being the wheel transmitting the bursts.

In a variant, the microprocessor 11 may simply detect that the monitoring antenna 21 is receiving electromagnetic energy at a level exceeding a defined threshold. The validation of the burst or bursts received by the acquisition antennae 22 to 25 is then independent of any recognition of a pattern in the bursts received by the monitoring antenna 21.

If the polled antenna (22) is not supplying a signal, or is supplying an unrecognized bit pattern, the microprocessor 11 orders the changeover-switching circuits 13 to poll another acquisition antenna, such as 23, during a time window (FIG. 2D) centred on a future instant, as close as possible, of retransmission of the train of five bursts, that is to say about 6 minutes after the current instant. If the vehicle is unused, at rest, and if the wheels 2 to 5 are therefore transmitting only every hour, the mapping of the positions of the wheels individualized in the central unit 1 is then slowed, but that does not present any drawback, because of the fact that the vehicle is immobilized.

When the vehicle is running, the microprocessor 11 thus locates the transmitting wheel 22 to 25 with a delay of 0 (FIG. 2C), 1 (FIG. 2D), 2 (FIG. 2E) or 3 (FIG. 2F) periods T of 6 min.

The process is continued in order thus subsequently to locate two other wheels 2 to 5 which are themselves transmitting and then to deduce the position of the last wheel.

If the transmitter devices 20, 30, 40, 50 are transmitting, in the bursts, an identity codeword, specific to each of them, the central unit 1 can draw up a table of the configuration of the wheels 2 to 5 associating each identity codeword with an individual antenna 22 to 25, that is to say in fact to a wheel location 2 to 5. It is hence a matter of automatically determining the configuration of the checking system, that is to say the location of each of the wheel devices 20, 30, 40, 50. Once this configuration has been determined, the central unit 1 can use only the main antenna 21 to monitor the four wheels 2 to 5, subject to renewing the configuration process when the vehicle is stopped for a certain length of time and when wheels 2 to 5 are then capable of being changed or exchanged.

In a variant, it is possible, in contrast, to carry on the polling of the individual antennae 22 to continuously, and it is then pointless to transmit the identity of the transmitter in each burst, which makes it possible to shorten the bursts and thereby to save the batteries of the transmitters.

What is claimed is:

1. System for checking the pressure of the tires of the wheels (2–5) of a vehicle including individual wheel-checking devices, each with a pressure sensor and a transmitter (20, 30, 40, 50), a central unit (1) with a common receiver (12) and antenna circuits (21–25), comprising individual receiving antennae (22–25) associated respectively with the wheel locations (2–5), configured to work with the transmitters (20, 30, 40, 50) of the individual checking devices, the system being characterized in that the receiving-antenna means of the central unit (1) additionally comprise a main antenna (21) for monitoring all the pressure-checking devices (20, 30, 40, 50) and means (13) for switching over the common receiver (12) of the central unit (1) from the main monitoring antenna (21) onto each of the individual acquisition antennae (22–25).

2. System according to claim 1, in which the individual receiving antennae (22–25) are electromagnetically associated, in a one-to-one way, with the respective wheel locations (2–5).

3. System according to claim 1 in which, with the wheel-checking devices (20, 30, 40, 50) being configured to periodically transmit bursts of information bits, the changeover-switching means (13) are configured to switch over from the main receiving antenna (21) onto an individual receiving antenna (22–25) in the course of the same burst period.

4. System according to claim 1, in which the antennae (22–25) are radiating cables.

* * * * *